W. H. Jennison,
Water Filter,
Nº 6,408. Patented May 1, 1849.
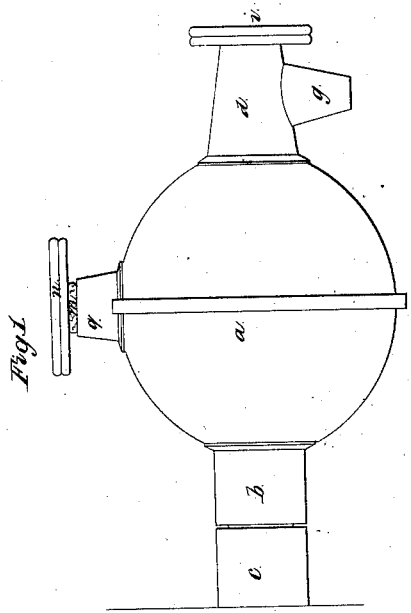
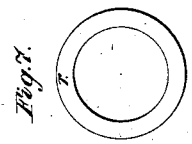
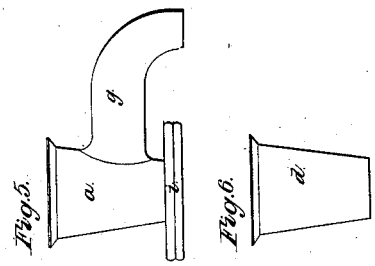
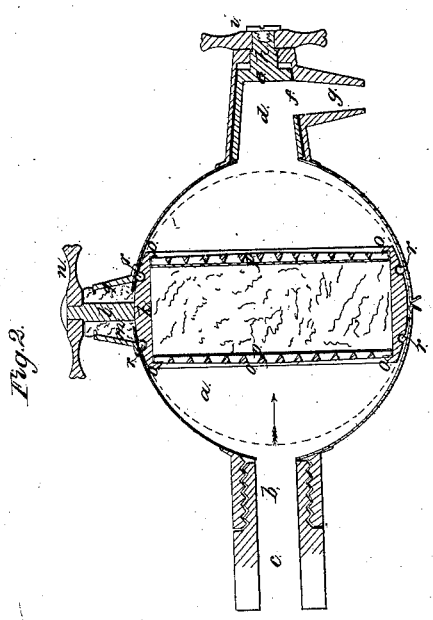
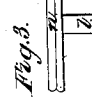
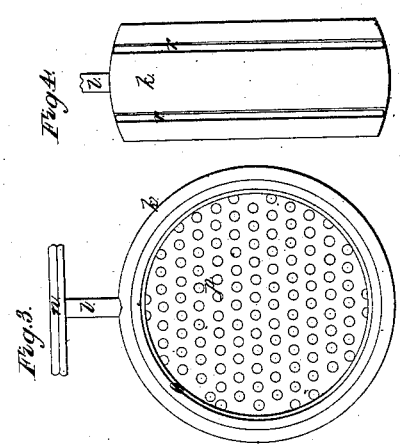

UNITED STATES PATENT OFFICE.

WM. H. JENNISON, OF NEW YORK, N. Y.

SELF-REGULATING FILTERING-DIAPHRAGM.

Specification of Letters Patent No. 6,408, dated May 1, 1849.

*To all whom it may concern:*

Be it known that I, WM. H. JENNISON, of the city, county, and State of New York, have invented new and useful Improvements in the Apparatus for Filtering and Drawing Water, and that the following is a full, clear, and exact description of the principle or character which distinguishes them from all other things before known—and of the manner of making, constructing, and using the same, reference being had to the accompanying drawings making part of this specification, in which—

Figure 1 is a side elevation of my improved filter, and stop cock, Fig. 2 a longitudinal vertical section thereof, Fig. 3 a front elevation of the filtering diaphragm, Fig. 4 a side elevation of the same, Figs. 5 and 6 separate representations of certain additions that may be made to the nozzle, and Fig. 7 separate view of vulcanized indian rubber packing ring.

The same letters indicate like parts in all the figures.

The nature of my invention consists first in making a filtering diaphragm to turn on a journal, and provided with a key or handle by which it can be turned, when this is combined with, and so arranged within an outer shell or case of spheroidal form, or otherwise so formed as to admit of a free passage of the water or other liquid when the diaphragm is turned longitudinally but which will have to pass through the filtering medium when the diaphragm is placed transversely, by means of which combination and arrangement either filtered or unfiltered water may be drawn, and by means of which also the filtering medium can be reversed within the outer case for the purpose of cleaning.

The second part of my invention, consists in making the filtering diaphragm of one or two movable perforated plates, held within a casing which admits of their being moved toward one another to a certain and definite extent, when this is combined with an interposed filtering medium composed wholly or partly of sponge or other elastic medium so that the pressure of water acting on the perforated plate shall force it toward and cause it to compress the sponge or other elastic filtering medium whereby I am enabled to produce a filter that is self adapting to the pressure of the head of water to be filtered, and which at the same time admits of cleansing the filtering medium by expanding and contracting it, for if the pressure of the head of water be increased and decreased alternately the filtering medium will be alternately compressed and expanded which produces the same cleansing effect as the squeezing a sponge in water.

The third part of my invention relates to the mode of packing the outer periphery of the filtering diaphragm and consists in making two grooves in the said periphery, one on each side of the axis of rotation, and fitting to each groove an annulus of vulcanized indian rubber which is inserted by stretching it over the periphery until it contracts in the groove leaving just sufficient projection to answer the purpose of packing. And the last part of my invention relates to the packing of the journal which passes through the outer shell or casing or for other packing and consists in filling a metallic case with the appropriate compounds of india rubber (such as is called Goodyears vulcanized rubber) while the said compound is in a soft and semifluid state, leaving a hole in the center such as will admit of inserting the journal or other article to be packed, and then baking the said rubber after the usual or any other mode of treating what is called vulcanized rubber; after being properly baked the metal case is soldered or otherwise secured to the outer shell or casing of the filter.

In the accompanying drawings (*a*) represents a hollow metallic case spheroidal in form, that is, a globe slightly elongated in the direction of the current of water that is to pass through it. The rear of this case is provided with a threaded tube (*b*) by means of which it can be secured to the end of a pipe (*c*) and the opposite or forward end is provided with a conical discharge pipe (*d*) to which is fitted a conical rotating valve (*e*) which is always kept tight by the pressure of the liquid within. This valve is hollow and open at (*f*) through the periphery for the discharge of the liquid through a vertical spout (*g*); the spout may be varied in form as represented in Figs. 5 and 6, or in any other desired manner. The forward end of the valve is provided with a stem (*h*) which passes through an aperture in the forward end of the discharge pipe and is there provided with a handle or key (*i*). The filtering medium consisting of well prepared sponge, is placed within a hollow ring (*k*) the outer periphery of which is the segment of a sphere provided with a journal (*l*) that passes through a stuffing box (*m*) in the upper part of the outer shell or case and provided with a lever or handle (*n*) by which the filtering diaphragm can be turned.

The inner periphery of the ring (*k*) is provided with two flanges (*o o*) one at each edge for the purpose of retaining the perforated disks (*p p*). By this arrangement the elasticity of the sponge or other elastic filtering medium between the two perforated disks keeps them apart and against the flanges (*o o*) when not under the pressure of the column of water, but when this pressure is let on, the pressure of this column moving in the direction of the arrow acts on the imperforated surface of the disk and forces it toward the other, thus compressing the elastic filtering medium to an extent proportionate to the force of the column, and thus adapting the filtering medium to the pressure of the head, instead of having the same degree of density for all pressures. Instead of making the perforations in the two disks round as shown in the drawing, I sometimes make them square, which increases the pervious portions of the surface.

The stuffing box (*m*) is made by filling a metallic tube (*q*) with india rubber in the soft and semi-fluid state, such rubber being of the preparation known as Goodyears vulcanized rubber, a stem or rod of less diameter than the journal (*t*) is inserted and in that condition the whole is cured by heating to make what is called vulcanized ruber. The tube is then secured by soldering or otherwise to the shell or outer case of the filter, and the journal (*m*) inserted which renders the whole water tight. The outer periphery of the ring of the filtering diaphragm is packed by means of two rings (*r r*) of vulcanized rubber. One of these rings in an undistended state, is represented by Fig. 7 of the drawing. Two grooves are made in the ring (*k*) one on each side of the journal (*l*) and the rings of india rubber (*r r*) are stretched over the periphery of the ring (*k*) until they fall into the grooves which are of such depth as to have the india rubber project sufficiently to pack the entire circumference within the casing, so that when the diaphragm is turned in a transverse position the water or other fluid can only pass by filtering through, but when turned in a longitudinal direction then the water can flow freely without being filtered. In this way the filtering medium is only used when desired, instead of being injured and filled up by the passage of water that does not require to be filtered.

It will be obvious from the foregoing that some of my improvements may be used without the others, as for instance the advantages of the self adapting filtering diaphragm by which the density of the filtering medium is adapted to the pressure of the column may be used with any form of filter, and the rotating diaphragm by means of which either filtered or unfiltered water can be drawn may be employed with any kind of filtering medium and with any form of filter which will admit of the passage of water by the side of the diaphragm when turned. And so of the mode of packing as these are applicable not only to filters of different constructions, but may be used for other purposes.

What I claim therefor as my invention and desire to secure by Letters Patent, is

1. The combination of a filtering diaphragm composed of elastic media and movable disks substantially as herein described, when combined with an outer shell or case within which it can rotate, either to force the liquid to pass through the filtering medium or to pass by the side thereof and issue without being filtered, the stem or journal of the diaphragm being passed through a stuffing box attached to the outer case, as herein described or in any other manner essentially the same.

2. I also claim making the filtering medium with one or both perforated disks movable as herein described when combined with an elastic filtering medium substantially as described.

WM. H. JENNISON.

Witnesses:
H. C. BANKS,
A. P. BROWNE.